United States Patent [19]

Izuno et al.

[11] 4,390,209
[45] Jun. 28, 1983

[54] PLASTIC SEAT-BACK FRAMEWORK AND METHOD FOR THE MANUFACTURE THEREOF

[75] Inventors: Sadami Izuno; Isao Kiyomitsu; Toshihiko Tsuji, all of Hiroshima, Japan

[73] Assignees: Toyo Kogyo Co., Ltd.; Delta Kogyo Co., Ltd., both of Hiroshima, Japan

[21] Appl. No.: 223,292

[22] Filed: Jan. 8, 1981

[30] Foreign Application Priority Data

Jan. 25, 1980 [JP] Japan ................................ 55-8020
Jan. 25, 1980 [JP] Japan ................................ 55-8021

[51] Int. Cl.³ .............................................. A47C 7/36
[52] U.S. Cl. ................................................ 297/410
[58] Field of Search ...................... 297/410, 391, 452

[56] References Cited

U.S. PATENT DOCUMENTS 3,572,831 3/1971 Barecki et al. .................... 297/410
3,608,965 9/1971 Cziptschirsch .................... 297/410
3,904,241 9/1975 Makinen ............................ 297/410

FOREIGN PATENT DOCUMENTS

2856695 7/1979 Fed. Rep. of Germany ...... 297/410
2024615 1/1980 United Kingdom ............... 297/410

Primary Examiner—Francis K. Zugel
Attorney, Agent, or Firm—Wenderoth, Lind & Ponack

[57] ABSTRACT

A seat back framework of one-piece construction together with a head rest support is made from a single blank of fiber-reinforced plastics. The seat back framework comprises a generally rectangular body having opposite upper and lower walls, a pair of opposite side walls and a connecting wall extending between the side walls in spaced relation to the upper wall with a support space defined therebetween. A pair of guide members for axially adjustably supporting corresponding legs forming a part of the head rest assembly together with a head rest are formed on the rectangular body within the support space.

3 Claims, 17 Drawing Figures

PLASTIC SEAT-BACK FRAMEWORK AND METHOD FOR THE MANUFACTURE THEREOF

BACKGROUND OF THE INVENTION

The present invention relates generally to a vehicle seat assembly and, more particularly, to a plastic framework for the seat back having an adjustable head-rest support. The present invention also relates to a method for manufacturing the plastic framework for the seat back.

It is a recent trend in the automobile industry to minimize the weight of an automobile and, for this purpose, a synthetic resin or plastics is largely employed as material for various component parts of automobile interior installations. An automobile seat assembly including a seat and a seat back is not an exception, such as disclosed in the Japanese Laid-open Patent Publication No. 54-155526, laid open to public inspection on Dec. 7, 1979.

The use of the synthetic resin is effective not only to reduce the weight of the automobile seat assembly, but also to enable the automobile seat assembly to be manufactured in one-piece construction by means of the existing plastics molding technique. However, it has been found that the structure of a framework for the seat assembly which can be manufactured in one-piece construction by the utilization of the existing plastics molding technique is limitted and, in particular, a difficulty is involved in the manufacture of the automobile seat framework of a type having some working elements.

When it comes to a head rest assembly for supporting and protecting the head of an occupant sitting on the automobile seat assembly, a support for the support of the head rest assembly requires a relatively high rigidity sufficient to make the head rest assembly withstand against impacts the occupant's head may give thereto during, for example, automobile collision. Because of the design limitation imposed on the plastics molding technique and also because of the relatively high rigidity required by the head rest support, the head rest assembly combined in the head rest assembly is such that the height of the head rest relative to the seat back cannot be adjustable. In other words, according to the prior art, the conventional seat back framework made of plastics is molded together with the head rest and has no capability of adjusting the height of the head rest relative to the seat back according to the occupant's sitting height.

SUMMARY OF THE INVENTION

Accordingly, the present invention has been developed with a view to substantially eliminating the disadvantages and inconveniences inherent in the prior art synthetic framework for the seat back and has for its essential object to provide an improved synthetic framework of one-piece construction for the seat back having a head rest support that enables the head rest assembly to be adjustable according to the occupant's sitting height.

Another important object of the present invention is to provide an improved framework of the type referred to above, wherein the head rest support integral with the seat back framework includes guide means effective to steadily support the head rest assembly for adjustment in a direction away from and close towards the seat back.

A further object of the present invention is to provide an improved framework of the type referred to above, which can be manufactured in one-piece construction together with the head rest support by the use of inexpensive synthetic material and also by the use of any known plastics molding technique involving the minimized manufacturing cost.

It is a related object of the present invention to provide a method for manufacturing the seat back framework of the type referred to above, which can be carried out without skills required and with a minimized number of attendant workers.

According to the present invention, the seat back framework comprises a generally rectangular body having a surrounding reinforcement frame which protrudes generally at right angles to and from the perimeter of the body. While the reinforcement frame is constituted by upper and lower walls opposite to each other and a pair of opposite side walls, the body also has a connecting wall extending between the opposite side walls in parallel relation to the upper wall with its opposite ends integral with the side walls and spaced a predetermined distance from the upper wall to define a support space therebetween. The upper wall has a pair of spaced first support notches of generally U-shaped configuration defined therein and extending transversely thereof and, similarly, the connecting wall has a pair of spaced second support notches of generally U-shaped configuration defined therein and extending transversely thereof, the first and second support notches extending in the opposite directions with respect to each other.

The head rest support integral with the seat back framework is so designed and so adapted as to axially adjustably support a pair of spaced legs which form a part of the head rest assembly together with a cushioned head rest. The head rest support comprises a pair of generally elongated guide members of generally U-shaped cross-section each having an elongated aperture extending completely through the length of the corresponding guide member for the support of a substantially intermediate portion of the corresponding leg of the head rest assembly. Each of these guide members is so defined within the support space with its elongated aperture aligned at one end with a portion of the corresponding first support notch and at the other end with the corresponding second support notch.

In this construction, the head rest assembly is mounted on the seat back framework with the legs inserted through that portions of the first support notches, then through the elongated apertures in the guide members and finally through that portions of the second support notches, respectively.

Each of the guide members may be of any construction provided that it can cooperate with the corresponding first support notch to prevent any possible lateral displacement of the corresponding leg relative to the longitudinal axis thereof. Preferably, each of the guide members is of such a construction as to prevent the corresponding leg from being displaced in all lateral directions except for the longitudinal direction thereof. By so constructing, the head rest support can be imparted with sufficient physical strength and rigidity.

Furthermore, according to the present invention, the seat back framework with the head rest support can be manufactured in one-piece construction from a generally rectangular blank of synthetic resin, preferably fiber-reinforced thermoplastic material, by the utilization of any known plastics molding technique, preferably by means of a stamping press work. In carrying out the method of the present invention, only a pair of stamping mold halves are used to manufacture the single integer of the seat back framework with the head rest support.

BRIEF DESCRIPTION OF THE DRAWINGS

These and other objects and features of the present invention will become apparent from the following detailed description of the present invention taken in conjunction with a preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
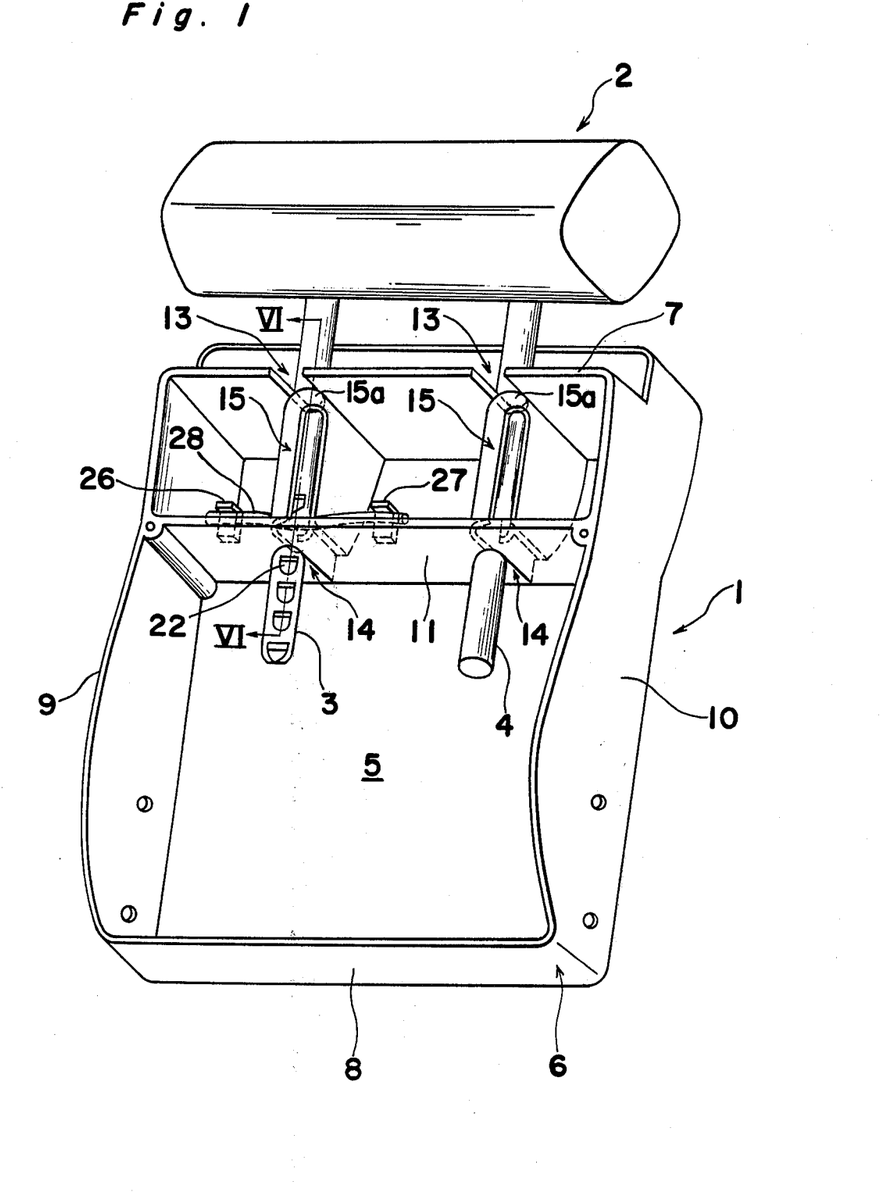
FIG. 1 is a perspective view of a seat back framework according to the present invention with a head rest assembly shown as mounted thereon.
Figure 2:
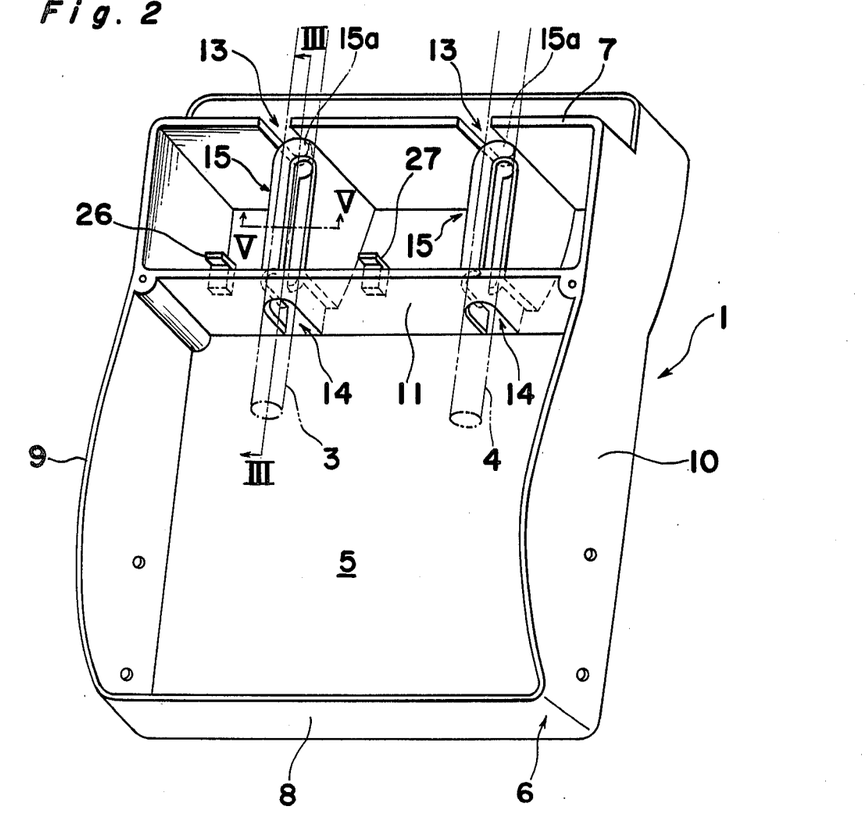
FIG. 2 is a view similar to FIG. 1, with the head rest assembly removed.

Referring first to FIGS. 1 and 2, a seat back framework 1 is made of synthetic material, for example, either fiber-reinforced plastics or fiber-reinforced thermoplastic material, and is of one-piece construction together with a head rest support as will be described later. In FIG. 1, a head rest assembly 2 of any known construction is shown as having a pair of spaced legs 3 and 4 extending outwardly from a cushioned head rest in parallel relation to each other, which head rest assembly is supported for adjustable movement in a direction close towards and away from the seat back framework 1 in a manner as will be described later.

The seat back framework 1 comprises a generally rectangular plate-like body 5 which has a surrounding reinforcement frame 6 protruding from the perimeter of the body 5 generally at right angles thereto and composed generally of opposite upper and lower walls 7 and 8 and a pair of opposite side walls 9 and 10. The body 5 also has a connecting wall 11 spaced a predetermined distance from the upper wall 7 and extending between the side walls 9 and 10 with its opposite ends integral therewith. The head rest support for the adjustable support of the legs 3 and 4 of the head rest assembly is substantially positioned between the upper and connecting walls 7 and 11 and within a support space defined therebetween.

As elements cooperative with the head rest support as will be described later, a pair of spaced first support notches 13 and a pair of spaced support notches 14, all being of generally U-shaped configuration, are respectively defined in the upper and connecting walls 7 and 11 so as to extend in the opposite directions with respect to each other and in a direction perpendicular to the longitudinal extent of any one of the upper and connecting walls 7 and 11. So far illustrated, as best shown in FIGS. 3 and 4, each of the first support notches 13 extends inwardly of the upper wall 7 from the free side edge 7a thereof while each of the second support notches 14 extends inwardly of the connecting wall 11 from a portion of the body 5 in register with the connecting wall 11.

Figure 3:
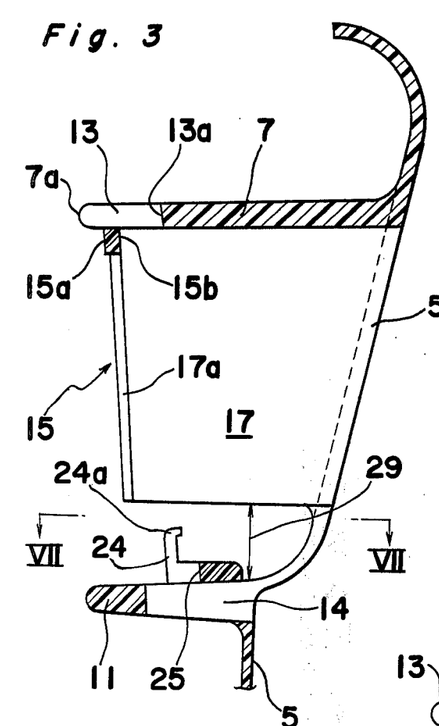
FIG. 3 is a cross sectional view on an enlarged scale, taken along the line III—III in FIG. 2.
Figure 4:
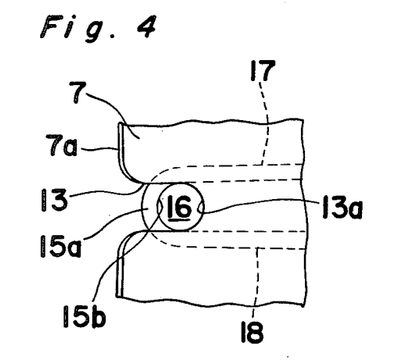
FIG. 4 is a top plan view showing one of first support notches relative to a corresponding guide member shown in FIG. 3.
Figure 5:
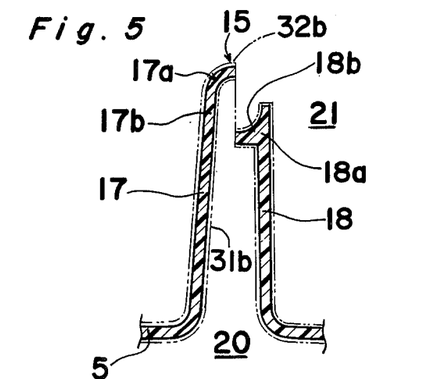
FIG. 5 is a cross-sectional view, on an enlarged scale, taken along the line V—V in FIG. 2.

As best shown in FIGS. 3 to 5, the head rest support comprises a pair of guide members 15 one for each leg 3 or 4 of the head rest assembly, each of said guide members 15 being so shaped and so designed as to support the corresponding leg 3 or 4 in an axially movable manner but to restrain the corresponding leg 3 or 4 from being displaced more than a predetermined distance in all lateral directions. The guide members 15 are of identical construction and, therefore, only one of the guide member associated, for example, with the leg 3 of the head rest assembly will hereinafter be described in details for the sake of brevity.

The guide member 15 is of generally U-shaped cross-section composed of a pair of opposite support walls 17 and 18 protruding from the body 5 into the support space between the upper and connecting walls 7 and 11 in spaced relation to each other. As best shown in FIG. 5, a free end portion 17a of the support wall 17 remote from the body 5 is curved so as to deflect towards the other support wall 18 and terminates in a plane lying at right angles to the body 5 and passing intermediately of the space between the support walls 17 and 18. The curved free end portion 17a of the support wall 17 has an inner face 17b so curved and so shaped as to follow the contour of the cross-sectional representation of the leg 3 through 90° with respect to the longitudinal axis of the leg 3.

On the other hand, a free end portion 18a of the support wall 18 has a curved inner face 18b positioned in 180° offset relation to the curved inner face 17b with respect to the longitudinal axis of the leg 3 and so curved an so shaped as to follow the contour of the cross-sectional representation of the leg 3 through 90° with respect to the longitudinal axis of the leg 3. The support walls 17 and 18 are, as best shown in FIGS. 1 to 4, connected together by means of a generally semi-circular abutment 15a having its opposite ends integral with the support walls 17 and 18, one side face of said abutment 15a being flush with respective side faces of the support walls 17 and 18 which, so far illustrated, are integral and fast with the upper wall 7, but may be spaced from the upper wall 7. For the purpose of reinforcement, the semicircular abutment 15a has a wall thickness larger than that of any one of the support walls 17 and 18.

As best shown in FIG. 4, the semi-circular abutment 15a in each of the guide members 15 is so designed as to define a support opening 16 in cooperation of a portion 13a of the respective first support notch 13 which corresponds to the bottom of the shape of a figure "U". This wall-thickened abutment 15a serves, while the corresponding leg 3 is inserted through the support opening 16 in the manner best shown in FIGS. 1 and 6, to restrain the corresponding leg 3 from being displaced forwards when a forwardly acting load or impact is applied to the cushioned head rest of the head rest assembly 2. Because the abutment 15a is wall-thickened as hereinabove described, there is no possibility that the abutment 15a in each of the guide members 15 breaks even when the forwardly acting load or impact is so applied.

Figure 6:
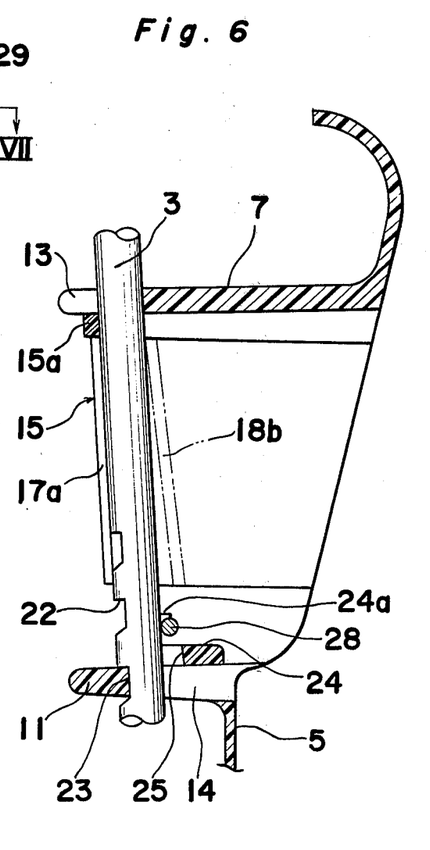
FIG. 6 is a view similar to FIG. 3, with one of legs of the head rest assembly shown therein.

More specifically, assuming that the head rest assembly is mounted on the seat back framework of the construction described above, while each of the legs 3 and 4 of the head rest assembly extend through the space defined between the curved inner faces 17b and 18b in the respective support walls 17 and 18 with its opposite ends positioned externally of the upper and connecting walls 7 and 11 relative to the support space in the manner as best shown in FIGS. 1 and 6, that portion 13a of the respective first support notches 13 corresponding to the bottom of the shape of a figure "U" serve to restrain the respective legs 3 and 4 from being displaced laterally rearwardly over a predetermined distance while respective portions of the second support notches 14 corresponding to the bottom of the shape of a figure "U" serve to restrain the legs 3 and 4 from being displaced laterally forwardly over a predetermined distance. In addition, since each of the support openings 16, the semi-circular segments of which are respectively defined by the U-shaped abutments 15a and that portions 13a of the respective first support notches 13, exhibits a circular shape of a diameter substantially equal to the outer diameter of the respective leg 3 or 4, any possible lateral displacement of the legs 3 and 4 in a direction parallel to the longitudinal extent of the upper wall 7 can also be avoided.

As best shown in FIG. 6, for the purpose as will become clear from the subsequent description concerning the capability of adjustment of the height of the head rest assembly relative to the seat back, the curved inner face 18b in the support wall 18 in each of the guide members 15 extends from one extremity adjacent the upper wall 7 to the opposite extremity adjacent to the connecting wall 11 so as to separate away from the curved inner face 17b in the associated support wall 18. Furthermore, one of the legs 3 and 4 of the head rest assembly, for example, the leg 3 so far illustrated, has a plurality of detent recesses 22 defined inwardly therein in equally spaced relation to each other as best shown in FIGS. 1 and 6, each of the detent recesses 22 being so sized and so shaped as to receive therein the wall thickness of the connecting wall 11, as best shown in FIG. 6, to set the head rest assembly at a predetermined height relative to the seat back assembly. It is to be noted that, so far illustrated, the portion of the second support notch 14 which corresponds to the bottom of the shape of a figure "U" is shaped flat as shown by 23 in FIG. 7 in order to assure a firm engagement of that portion of the connecting wall 11 facing the second support notch 14 into a selected one of the detent recesses 22 on the leg 3.

Figure 7:
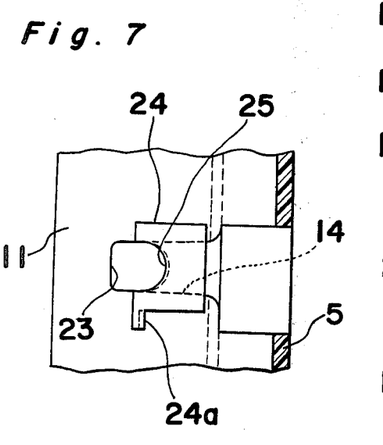
FIG. 7 is a cross-sectional view taken along the line VII—VII in FIG. 3.

The head rest support also comprises a hook member 24 and a pair of catch members 26 and 27 all formed integrally with and mounted on the connecting wall 11 with the catch members 26 and 27 positioned on respective sides of the hook member 24 as best shown in FIGS. 1, 2 and 3 to 7. The hook member 24 has an inwardly extending cutout of U-shaped configuration defined at 25 as shown in FIG. 7, the radius of curvature of the U-shaped cutout 25 being slightly larger than that of the cross-section of the leg 3, said hook member 24 being mounted on the connecting wall 11 with the cutout 25 facing the flat portion 23 of the second support notch 14. The hook member 24 also has an upright hook portion 24a to which a substantially intermediate portion of a wire spring 28 is engaged for the purpose as will be described later.

The wire spring 28 is used to bias the leg 3 forwardly in a direction away from the body 5 to let a selected one of the detent recesses 22 to receive the connecting wall 11, thereby locking the head rest assembly at a selected height relative to the seat back framework 1. This wire spring 28 has its opposite ends engaged to the catch members 26 and 27, that intermediate portion of said wire spring 28 being axially offset relative to any one of the opposite ends thereof and hooked to the upright hook portion 24a of the hook member 24. As shown in FIG. 3, since the side faces of the respective support walls 17 and 18 in the guide member 15 are spaced from the connecting wall 11 to define a space 29 therebetween, the hook member 24 can be positioned on the connecting wall 11 immediately below the support walls 17 and 18.

Where the height adjustment of the head rest assembly is to be carried out, what is necessary is to apply an external force to the head rest to tilt the legs 3 and 4 against the wire spring 28 and then to pull or push the head rest upwardly or downwardly. More specifically, when the external force is applied to the head rest, the end portions of the respective legs 3 and 4 opposite to the head rest and positioned inside the seat back are pivoted against the wire spring 28 in a direction counter to the direction in which the external force is applied, with the result that the detent recess 22 then engaged with the connecting wall 11 is disengaged therefrom. Thereafter, by pulling or pushing the head rest, another one of the detent recesses 22 can be brought in register with the connecting wall 11 and, by removing the external force, is subsequently engaged with the connecting wall 11 by the action of the wire spring 28 thereby completing the height adjustment of the head rest assembly.

Figure 8:
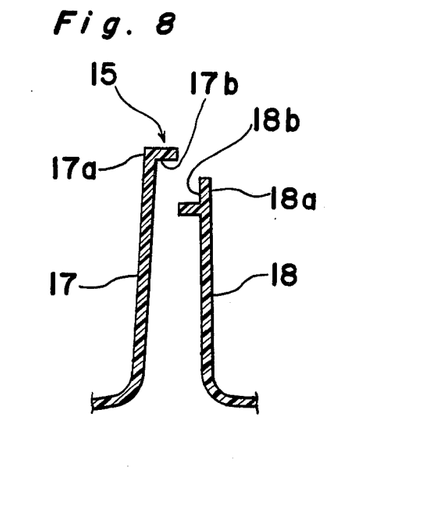
FIGS. 8 and 9 are views similar to FIG. 5, showing two modified forms of the guide members, respectively.
Figure 9:
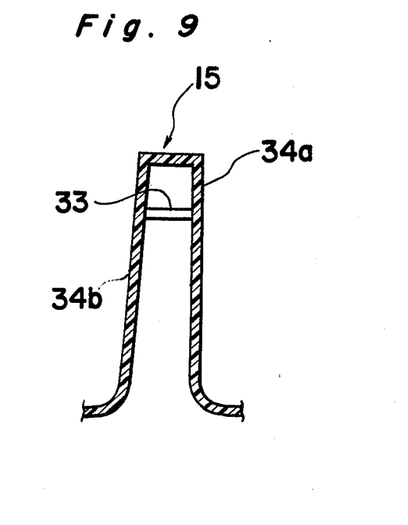
Figure 10:
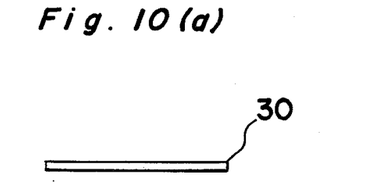
FIGS. 10(a) to 10(e) are schematic diagrams illustrating the principle of the manufacturing method according to the present invention.

It is to be noted that, although the free end portions 17a and 18a of the respective support walls 17 and 18 of each guide member 15 have been described as having the curved inner faces 17b and 18b which, in cross section, occupy the opposite portions of the imaginary circle of a diameter substantially equal to the outer diameter of the associated leg 3 or 4, they may be right-angled as shown in FIG. 8. Alternatively, each of the guide members 15 may be constituted by a single wall member of U-shaped cross-section as shown in FIG. 9 with the opposite wall portions 34a and 34b corresponding in function to the wall members 17 and 18. In the modified form of the guide members 15 shown in FIG. 9, each of the modified guide members must have a wall member 33 extending from one side face to the other of the single wall member and spanning between the opposite wall portions 34a and 34b to define a hollow through which the corresponding leg 3 or 4 extends.

In practice, all of the component parts of the seat back framework 1 according to the present invention are formed in one-piece construction together with the component parts of the head rest support except for the wire spring 28 from a single blank of synthetic resin, specifically either fiber-reinforced resin or fiber-reinforced thermoplastic resin, by means of a stamping molding technique which will now be described with particular reference to FIGS. 10 to 13.

The principle of the stamping molding technique is shown in FIGS. 10(a) to 10(e). Referring to FIGS. 10(a) to 10(e), the stamping molding technique is performed by the use of a pair of mating mold halves 31 and 32, the mold half 31 being movable in a direction close towards and away from the mold half 32 so far illustrated. A blank 30 of fiber-reinforced thermoplastic resin having a predetermined thickness as shown in FIG. 10(a) is, after having been cut to a predetermined size sufficient to manufacture the seat back framework of a required size, heated at a suitable temperature for a suitable time to cause it to be softened with its thickness increased to a value three times the original thickness as shown by 30' in FIG. 10(b). Thereafter, the softened blank 30' is placed between the mold halves 31 and 32, and the mold halves 31 and 32 are subsequently closed together to cause the blank 30' to conform to the shape of the mold assembly including the mold halves 31 and 32, it being to be noted that the mold halves 31 and 32 shown in FIGS. 10(c) to 10(e) are simplified for the purpose of illustration of the principle of the stamping molding technique. Prior to the mold halves 31 and 32 being completely closed together and during the course of movement of the movable mold half 31 towards the fixed mold half 32, the blank 30' is partially cut into first and second segments 30'a and 30'b by a cutter edge, defined at 31a in the movable mold half 31, in cooperation with a mating cutter edge defined at 32a in the fixed mold half 32 in a manner as shown in FIG. 10(d). At the time of completion of the movement of the movable mold half 31 towards the fixed mold half 32 as shown in FIG. 10(e), the first segment 30'a from the blank 30' has the first support notches 31 defined therein, while the second segment 30'b from the same blank 30' has the curved inner faces 17b and 18b defined therein.

Thereafter, the movable mold half 31 once closed together with the fixed mold half 32 is moved away from the fixed mold half 32 to eject the resultant molded article out of the mold assembly, thereby completing one cycle of stamping molding operation.

Figure 11:
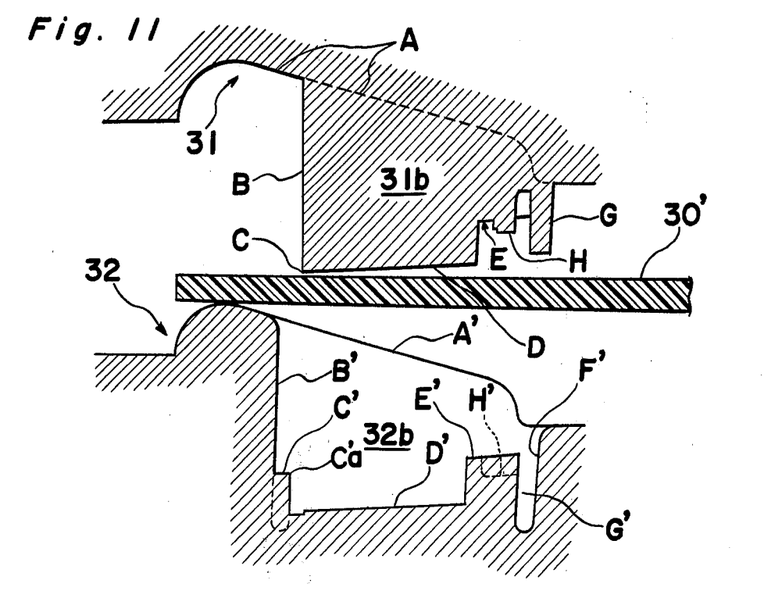
FIG. 11 is a cross-sectional view of a portion of a stamping mold assembly used in the practice of the method of the present invention, showing mold halves opened.
Figure 12:
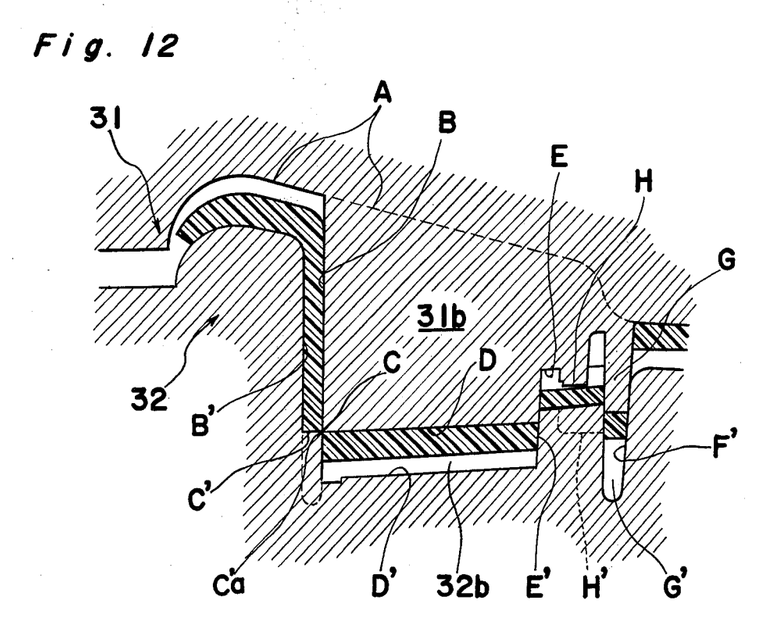
FIG. 12 is a view similar to FIG. 11, showing the mold halves closed halfway.

The details of each of the mold halves 31 and 32 to be used in the manufacture of the seat back framework according to the present invention will be described with particular reference to FIGS. 11 to 13. It is to be noted that, in each of FIGS. 11 to 13, only a portion of the movable mold half 31 required to form the first support notches 13 in the upper wall 7 and the curved inner faces 17b and 18b in the support walls 17 and 18 in each guide member 15 is shown together with the mating portion of the fixed mold half 32.

Figure 13:
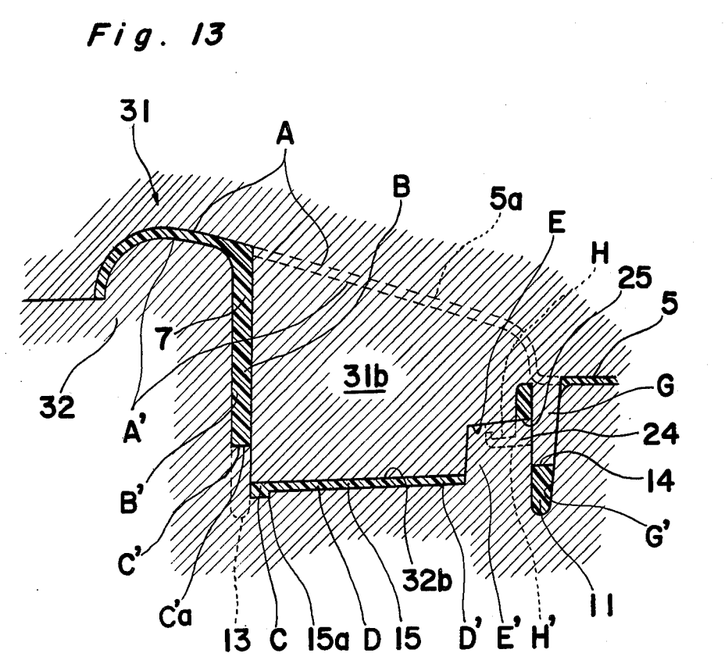
FIG. 13 is a view similar to FIG. 11, showing the mold halves closed completely.

The movable and fixed mold halves 31 and 32 have defined therein forming walls A and A', respectively, which when these mold halves 31 and 32 are closed together as shown in FIG. 13, define an inclined wall 5a (FIG. 3) continued to and protruding from the body 5 of the framework 1. The movable mold half 31 also has defined therein a projection 31b protruding downwards from the forming wall A on the one hand and the fixed mold half 32 also has defined therein a recess 32b recessed inwardly of the forming wall A', said recess 32b being of such a shape complemental to the projection 31b that, when the movable mold half 31 is pressed against the fixed mold half 32 in a sequential manner shown in FIG. 11 to FIG. 13, that portion of the seat back framework 1 which is shown in section in FIG. 3 can be formed. In other words, an upright face of the projection 31b in the movable mold half 31, which is shown by B, cooperates with a mating upright face B' of the recess 32b in the fixed mold half 32 to sandwich a portion of the softened blank 30' to define the upper wall 7, whereas an edge C formed in the projection 31b adjacent to the free end thereof cooperate with an edge C'a of a step C', formed in the fixed mold half 32 adjacent the bottom of the recess 32b to define a first cutter area as can readily be understood from FIG. 12. The free end face D of the projection 31b in the movable mold half 31 cooperates with the bottom face D' of the mating recess 32b to define the guide member 15.

Accordingly, when the mold halves 31 and 32 are completely closed together as shown in FIG. 13, a portion of the upper wall 7 separated from the guide member 15 by the first cutter area referred to above is formed into the first support notch 13 and, at the same time, the curved inner faces 17b and 18b are formed by the bottom face D' of the recess 32b then receiving therein the projection 31b.

On the other hand, an upright projection E' protruding upwardly from the bottom face D' of the recess 32b in the fixed mold half 32 cooperates with a socket portion E, defined in the projection 31b in the movable mold half 31 in complemental relation to the upright projection E', to define a second cutter area operable to define the space 29 (FIG. 3) in the resultant seat back framework 1. The fixed mold half 32 also has a narrow pocket G' extending inwardly thereof and defined between the upright projection E' and an upright wall F' opposite to the step C' is cooperative with a mating narrow projection G, extending downwardly from the movable mold half 31 in complemental relation in shape to the narrow pocket G' and positioned next to the socket portion E, to define the connecting wall 11 in the resultant seat back framework 1. Between the projection G and the pocket G' is defined a third cutter area to permit the projection G to cut a portion of the connecting wall 11 to define the second support notch 14 therein.

Projections H formed in the socket portion E cooperate with grooves H' formed in the upright projection E' to define the hook member 24 having the cutout 25.

The molding of the integer of the seat back framework with the head rest support according to the present invention is possible because each of the guide members 15 for axially movably supporting the respective legs 3 and 4 of the head rest assembly is so shaped as to be formed without the employment of any mandrel or any core member to define the curved inner faces 17b and 18b in the respective support walls 17 and 18.

From the foregoing, it has now become clear that the seat back framework with the head rest support in accordance with the present invention is effective not only to contribute to the reduced weight of the automobile seat assembly, but also to firmly support the head rest assembly in a height adjustable manner and without the legs of the head rest assembly being permitted to displace laterally. It is also clear that the seat back framework with the head rest support according to the present invention can readily be manufactured without any skill required and at the reduced manufacturing cost because of the employment of the plastics in combination with the stamping molding technique.

Although the present invention has fully been described in connection with the preferred embodiment thereof with reference to the accompanying drawings, it is to be noted that various changes and modifications are apparent to those skilled in the art. By way of example, the first support notches 13 in the upper wall 7 and the second support notches 14 in the connecting wall 11 may extend in the respective manners reverse to that shown in FIGS. 1, 2, 3 and 6.

Accordingly, such changes and modifications are to be understood as included within the true scope of the present invention unless they depart therefrom.

We claim:

1. A plastic seat back framework of one-piece construction made of a moldable synthetic resin together with a head rest support adapted to axially adjustably support a pair of spaced legs which form a part of the head rest assembly together with a head rest, which comprises a generally rectangular body having a surrounding reinforcement frame protruding generally at right angles to and from the perimeter of the rectangular body, said reinforcement frame being constituted by upper and lower walls opposite to each other and a pair of opposite side walls, said rectangular body also having a connecting wall extending between the opposite side walls in parallel relation to the upper wall with its opposite ends integral respectively with the side walls and spaced a predetermined distance from the upper wall to define a support space therebetween, said upper wall having a pair of spaced first support notches of generally U-shaped configuration defined therein and extending transversely thereof, said connecting wall having a pair of spaced second support notches of generally U-shaped configuration defined therein and extending transversely thereof, said first and second support notches extending in the opposite directions with respect to each other, and said head rest support comprising a pair of guide members of generally U-shaped cross-section each of said guide member having an elongated aperture extending therethrough for the support of a substantially intermediate portion of the corresponding leg, each of said guide members being integrally formed on the rectangular body and positioned within the support space with the elongated aperture aligned at one end with a portion of the corresponding first support notch and at the other end with a portion of the corresponding second support notch, the head rest assembly being adapted to be mounted on the seat back framework with the legs inserted through that portions of the first support notches, then through the apertures in the guide members and finally through that portions of the second support notches, respectively.

2. A framework as claimed in claim 1, wherein each of the guide members is constituted by a pair of wall members protruding from the rectangular body into the support space in spaced relation to each other and a generally U-shaped abutment connecting the wall members together, said elongated aperture in each of the guide members being defined by a pair of curved inner faces formed on the free end portions of the respective wall members in face-to-face relation to each other and also in 180° offset relation to each other with respect to the longitudinal extent of the corresponding leg of the head rest assembly.

3. A framework as claimed in claim 2, wherein each of said curved inner faces represents a cross-sectional shape of a quarter of the right circle, said curved inner faces being positioned on respective sides of a plane perpendicular to the rectangular body and passing intermediately between the associated wall members.

* * * * *